H. B. MURDOCK.

Assignor, by direct and mesne assignments, to the AMERICAN INJECTOR COMPANY.

INJECTOR.

No. 10,971. Reissued Dec. 4, 1888.

Attest.

John E. Miles.

Adelaide A. Anderson.

Inventor.

Horace B. Murdock, by Geo. H. Lothrop. atty.

N. PETERS, Photo-Lithographer, Washington, D. C.

UNITED STATES PATENT OFFICE.

HORACE B. MURDOCK, OF DETROIT, MICHIGAN, ASSIGNOR, BY DIRECT AND MESNE ASSIGNMENTS, TO THE AMERICAN INJECTOR COMPANY, OF SAME PLACE.

INJECTOR.

SPECIFICATION forming part of Reissued Letters Patent No. 10,971, dated December 4, 1888.

Original No. 331,154, dated November 24, 1885. Application for reissue filed November 6, 1888. Serial No. 290,135.

*To all whom it may concern:*

Be it known that I, HORACE B. MURDOCK, of Detroit, in the county of Wayne and State of Michigan, have invented a new and useful Improvement in Injectors, of which the following is a specification.

Figure 1:
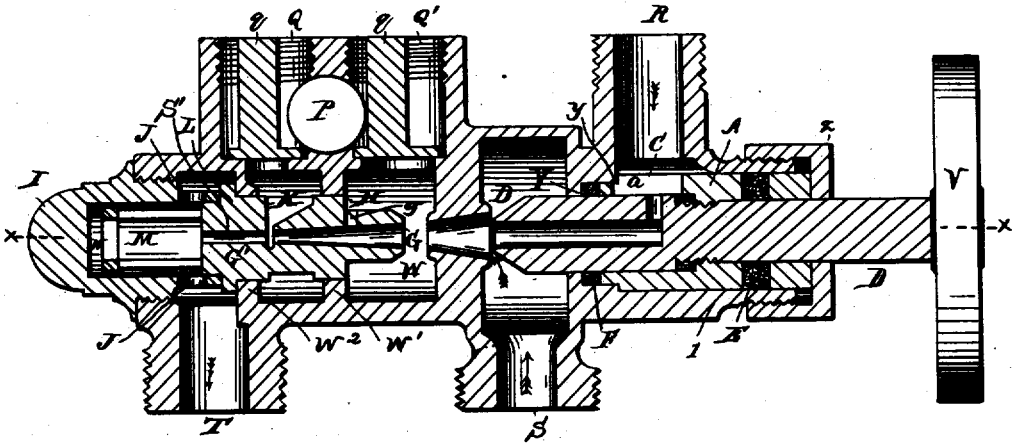
Figure 2:
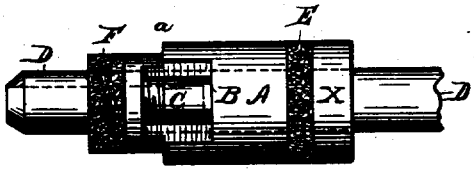
Figure 3:
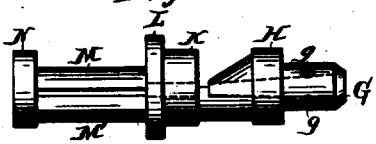
Figure 4:
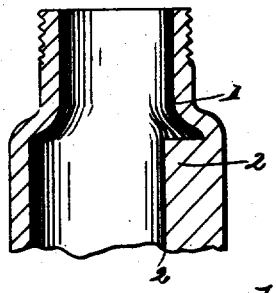

Figure 1 is a longitudinal section. Fig. 2 is a perspective of the steam-jet passage. Fig. 3 is a perspective of the delivery-tube; and Fig. 4 is a detail of part of the case, showing the lug which prevents the nut A from turning.

My inventiou consists in certain improvements in the construction of injectors, hereinafter fully pointed out in the claims.

The shell of the injector is cast in one piece, and on it are cast the projecting pipes R, which is the steam-entrance; S, which is the water-entrance; T, which is the watery-delivery pipe on the way to the boiler; and P, which is the overflow-pipe connected to one or more projections, Q Q′, in which are situated the overflow check-valves. With the case are cast partitions Y, W, W′, and W², which separate the interior of the case into steam, overflow, and discharge chambers.

D represents the steam-plug beveled at its inner end, as shown in the drawings, and provided at its outer end with a hand-wheel, V, by which it can be turned. Plug P is perforated longitudinally from its inner end to a point opposite the steam-nipple R, and at this point one or more holes, C, are bored transversely in the plug, meeting the longitudinal bore. From a point a little back of the holes C plug D is somewhat reduced in diameter its whole length, and has a screw-thread cut thereon, as shown in Fig. 1.

A represents a screw-thread adapted to screw on the thread on plug D and having on each side thereof a section, B, cut out to expose the holes C. Nut A is made cylindrical, except for the cut-away sections B, from its outer end to the point *a*, where it is reduced in size, as shown in Fig. 2, for the remainder of its length. This construction permits a lug, 2, Fig. 4, cast on the inner surface of the shell to engage with the side *a* of the cut-away portion of the nut A, so that said nut cannot turn when plug D is turned.

Z represents a stuffing-box on the end of the case, through which plug D passes.

E F represent packing-rings surrounding plug D—one at each end of nut A—the packing E being confined between the metal ring X, sliding on plug D, and the nut, and the ring F being confined between the other end of the nut and a partition in the case through which plug D passes, and which separates the steam and water chambers, thus forming a simple and efficient packing, which prevents escape of steam from the case and leakage of steam into the water-chamber, or vice versa.

G represeuts the combining-tube, bored in taper form through the partition W in the shell and in line with plug D. When plug D is screwed into the shell, its beveled end enters the flaring end of the combining-tube and prevents all flow of water to said tube, and by withdrawing plug D from tube G the size of the water-way around the end of the plug into the tube can be regulated to exactly correspond with the steam-pressure and the capacity of the injector.

W′ and W² represent two partitions cast in the shell and having perforations therethrough in which the delivery-tube G′ is supported, so that a longitudinal perforation, S′, therethrough is in line with combining-tube G, though an open space for overflow or relief is left between said tubes. The delivery-tube G′ is so constructed as to fit snugly in the perforations through partitions W′ and W², and a shoulder, L, thereon bears against partition W², and is clamped between said partition and the inner end of a screw-cap, I, which screws into and closes the end of the case, so that the delivery-tube is held firmly in position. In that part of the delivery-tube which lies between partitions W W′, I bore one or more transverse holes, H, connecting with bore S, to relieve the bore, which is made flaring, as shown in Fig. 1, from a surplus of water, and in that part of said delivery-tube which lies between partitions W′ W², I cut a slot, K, into the bore and bevel off the side thereof nearer partition W′ for like purposes of relief.

The end of the delivery-tube which lies within the screw-cap I is made of two arms, M′ M, joined at the outer end by a perforated disk, N, and in the inner end of the screw-cap are several holes, J, so that water which comes through the delivery-tube passes freely into the interior of screw-cap I and through holes J into the delivery-pipe T. Through the upper side of one or both of the chambers formed in the case by partitions W W′ W², I bore holes into the hollow projections Q Q′, and in said projections place the check-valves *q q*, which open outwardly from said chambers, and close by gravity to prevent entrance of air or water to the case of the injector. The ends of projections Q Q′ are closed by screw-caps, and the overflow-pipe P is connected with said projections Q Q′. The usual check-valve is placed in the delivery-pipe at any convenient point therein.

This construction renders the operation of putting together and taking apart the injector very simple, for by unscrewing the stuffing-box Z the nut A and plug D can be taken out, and by unscrewing the cap I the delivery-tube can be removed. The check-valves *q q* can also be removed by unscrewing the caps which close the projections Q Q′.

In the operation of my injector the distance of the end of plug D from the mouth of the combining-tube G is regulated to suit the steam-pressure and the capacity of the injector by turning the hand-wheel V, and thus causing the plug to travel in nut A. When this regulation has once been made, the plug D need not be further disturbed, and the injector is operated entirely by opening or closing a valve in the steam-pipe R.

The mode of operation is so well known that no description of it is necessary.

What I claim as my invention, and desire to secure by Letters Patent, is—

1. In an injector, a delivery-tube adapted to be inserted through an opening in the end of a case made in one piece and supported by one or more partitions cast in said case, in combination with a screw-cap adapted to close the opening in said case and clamp said delivery-tube rigidly in position, substantially as shown and described.

2. In an injector, the combination of the plug D, packing-rings E F, nut A, and stuffing-box Z, substantially as shown and described.

3. In combination with the plug D, having one end longitudinally perforated, and also having therein one or more transverse passages, C, the nut A, having the sections B cut therefrom, substantially as shown and described.

4. In an injector having its case made in one piece, and having steam, water-overflow, and discharge chambers formed therein by partitions cast integral therewith, a combining-tube formed in the partition which separates the water and overflow chambers, a plug adapted to close the mouth of said combining-tube and having therein a longitudinal bore connected with the steam-chamber, supported by a stuffing-box which closes one end of the case, and a delivery-tube connecting the overflow-chamber with the discharge-chamber and held in place by a screw-cap which closes the other end of said case, substantially as shown and described.

5. The combination of the delivery-tube having thereon shoulder L, perforated partition W², and screw-cap I, having therein one or more holes, J, substantially as shown and described.

HORACE B. MURDOCK.

Witnesses:
JOHN TRIX,
ADELAIDE A. ANDERSON.